*H. Carter,*
*Ditching Plow.*
*No. 97,164.*  *Patented Nov. 23, 1869.*
Fig. 1.
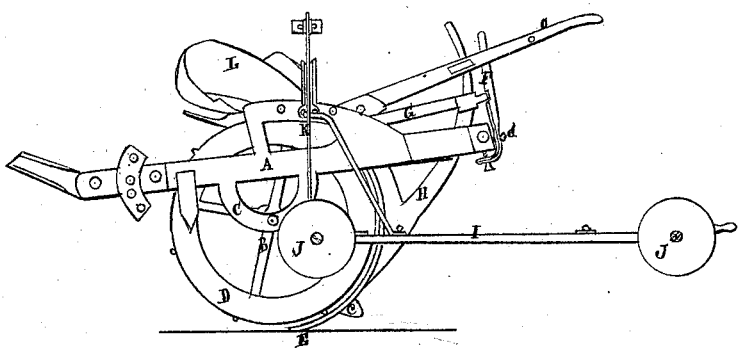
Fig. 2.
Fig. 3.
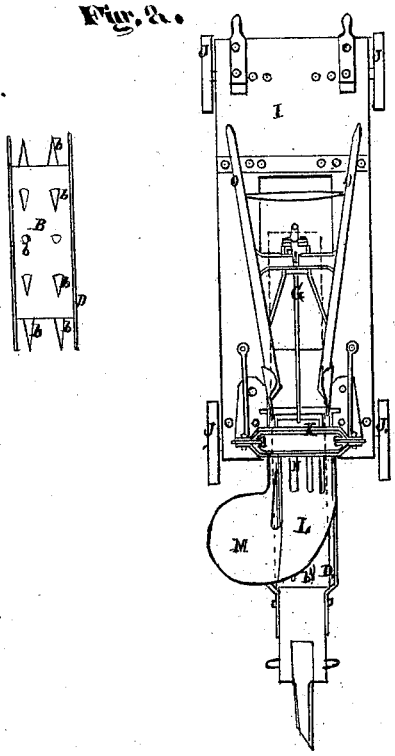
Inventor
H. Carter
Witnesses.
J. H. Burridge
D. L. Humphrey

UNITED STATES PATENT OFFICE.

HENRY CARTER, OF AYLMER, ONTARIO, CANADA.

IMPROVEMENT IN DITCHING-MACHINES.

Specification forming part of Letters Patent No. 97,164, dated November 23, 1869.

*To all whom it may concern:*

Be it known that I, H. CARTER, of Aylmer, in the Province of Ontario and Dominion of Canada, have invented certain new and useful Improvements in a Ditching-Machine; and I do hereby declare that the following is a full and complete description of the same, reference being had to the accompanying drawings, making part of this specification, in which—

Figure 1 is a side view of the ditcher; Fig. 2, a view of the top; Fig. 3, a detached section.

Like letters of reference refer to like parts in the different views.

This invention relates to a machine for cutting trenches or ditches by the employment of a plow or share, whereby the earth is loosened, conjointly and in combination with an elevator, by which the loosened dirt is carried up and thrown out along the side of the trench or ditch, as hereinafter more fully described.

In Fig. 1, A represents a frame mounted upon the wheel B, a detached view of which is shown in Fig. 3, having its axial bearings in the arc C, forming a part of the frame. Proceeding outwardly from each side of the periphery of said wheel is a deep flange, D, Fig. 3, also indicated by the dotted lines $a$, Fig. 2, thereby inclosing the rim of the wheel by two continuous sides. Projecting from the face of the wheel is a series of prongs or teeth, $b$, the purpose of which will presently be shown.

E, Fig. 1, is a plow or share, projecting under the lower side of the wheel. Immediately back from the point of said plow is a pair of cutters or colters, $c$, whereby the sides of the furrow made by the plow are smoothed down and straightened in the line of work. The plow referred to is attached to the frame A by a pivoted connection, thereby allowing it to be moved back from the wheel, and slightly elevated in relation thereto, so that it may run into the ground at a variable angle, as the nature of the soil may require. The plow is adjusted in its relation to the wheel by the standard or rod F, secured to the end of the frame by a screw, $d$, fitted in a slot, so that said standard can be moved upward or downward, thereby elevating or depressing the plow, it being attached to the standard by the arm G, the extreme end of which is lodged in the side of the standard, a notch being cut therein for its reception.

H is a guide, whereby the plow is retained in proper position while being adjusted.

I is a platform mounted upon the wheels J, and between the front end of which the wheel and plow, above described, are placed, and secured in position by the vertical frame K, attached to the platform, and between which the wheel and plow slide upward and downward, as and for a purpose hereinafter shown.

L is a conductor, the lip M or outer end of which projects beyond the side of the machine, whereas the inner end is fitted between the sides of the wheel, and is armed with a series of fingers, N, Fig. 2, between which the prongs projecting from the face of the wheel pass as the wheel revolves.

The practical operation of this machine is as follows, viz: The direction of the ditch being determined, the machine is placed in line therewith, so that the wheels supporting the platform shall be on either side, thereby bringing the wheel and plow directly upon the line of the work. The team whereby the machine is drawn is hitched thereto by means of a wide double-tree, so that each horse may walk along by the side of the ditch, outside of the dirt thrown out by the machine. The operator or driver takes his place upon the platform, holding the machine by the handles O. As the machine moves forward, the plow E, under the wheel, loosens up the dirt, which is then taken up by the prongs of the revolving wheel, and deposited upon the conductor or chute L, referred to, from which it slides onto the ground along the side of the cut. As the depth of the ditch increases, the wheel and plow descend between the platform, sustained and guided by the standards K, while the platform continues to roll upon the surface of the ground until the desired depth is obtained.

By this machine a clear, smooth, and even ditch or trench is cut, and of any desired depth, and with but little fatigue to the operator or team.

What I claim as my improvement, and desire to secure by Letters Patent, is—

1. The pronged wheel B, as arranged to operate in combination with the adjustable plow E, in the manner substantially as described, and for the purpose specified.

2. The conductor or chute L and fingers N, as arranged, in relation to and in combination with the wheel B and prongs *b*, in the manner as and for the purpose set forth.

3. The adjusting-standard F, arm G, guide A, and plow E, all combined and arranged to operate in the manner as described, and for the purpose set forth.

4. The combination and arrangement of the wheel B, plow E, frame K, and platform I, substantially as and for the purpose specified.

HENRY CARTER.

Witnesses:
  J. H. BURRIDGE,
  D. L. HUMPHREY.